United States Patent
Kliland et al.

(10) Patent No.: US 7,184,704 B2
(45) Date of Patent: Feb. 27, 2007

(54) ARRANGEMENTS AND METHODS FOR REMOTE CONFIGURATION OF PERSONAL EQUIPMENT VIA WIRELESS DETECTION OF USER-ID

(75) Inventors: Kevin Kliland, Oslo (NO); Arne Ivar Kvistad, Hundhamaren (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 814 days.

(21) Appl. No.: 09/984,014

(22) Filed: Oct. 26, 2001

(65) Prior Publication Data

US 2002/0065905 A1 May 30, 2002

(30) Foreign Application Priority Data

Oct. 27, 2000 (NO) .................................. 20005440

(51) Int. Cl.
*H04B 7/00* (2006.01)
(52) U.S. Cl. ..................... 455/41.2; 455/418; 455/419; 455/557; 455/558
(58) Field of Classification Search ............... 455/41.2, 455/418, 419, 557, 558; 713/1, 100, 184, 713/185
See application file for complete search history.

(56) References Cited

U.S. PATENT DOCUMENTS 5,960,085 A * 9/1999 de la Huerga ............. 340/5.61
5,983,273 A * 11/1999 White et al. ................ 709/229
6,108,540 A 8/2000 Sonti et al.
6,385,729 B1 * 5/2002 DiGiorgio et al. ........... 713/201
6,631,271 B1 * 10/2003 Logan ....................... 455/456.1
6,742,036 B1 * 5/2004 Das et al. ................... 709/226
6,981,152 B2 * 12/2005 Du et al. .................... 713/193

FOREIGN PATENT DOCUMENTS

WO 99/33293 7/1999
WO 01/29731 4/2001

OTHER PUBLICATIONS http://www.e-businessworld.com, Sep. 14, 2000, Stephen Lawson, IDS News Service/Hong Kong Bureau, "WAP phone becomes a remote control".
http://www.zdcustommedia.com, *Visions Magazine*, May/Jun. 2000, Susan Schreiner, "Enabling the Wireless Dream".
http://citeseer.nj.nec.com/directory.html, Stefan Berger et al., "Communication solutions for pervasive computing environments".

(Continued)

*Primary Examiner*—Edan Orgad
(74) *Attorney, Agent, or Firm*—Nixon & Vanderhye P.C.

(57) ABSTRACT

An arrangement and method for equipment remote control according to a predetermined user profile. Controllable equipment is provided with a first wireless communication device. A user identity badge is provided with a second wireless communication device for communication, when in-range, with the first wireless communication device. A mobile communication terminal in communication with an Internet Protocol (IP) network, and provided with a third wireless communication device, communicates, when in-range, with the second wireless communication device. User and equipment identities are communicated to a user profile server connected to the IP network, and a user profile is returned to the equipment which is configured accordingly.

17 Claims, 3 Drawing Sheets

OTHER PUBLICATIONS

Susan Schreiner; "Wireless: Wireless Technologies Enabling the Wireless Dream;" Vision Magazine, May/Jun. 2000; http://www.ce.org/vision_magazine/editions/2000/mayjune/p13_15.asp.

Berger, et al.; "Communication Solutions for Pervasive Computing Environments;" http://citeseer.nj.nec.com; section 4.2 Blueweb.

S. Lawson; "WAP Phone Becomes a Remote Control;" IDG News Service; Sep. 14, 2000; http://www.idg.net.

International Search Report mailed Feb. 15, 2002 in corresponding PCT Application PCT/NO2001/00426.

* cited by examiner

ARRANGEMENTS AND METHODS FOR REMOTE CONFIGURATION OF PERSONAL EQUIPMENT VIA WIRELESS DETECTION OF USER-ID

FIELD OF THE INVENTION

The present invention relates to arrangements and a methods for remotely configuring personal equipment, and particularly to such arrangements and methods that employ wireless technology.

BACKGROUND

Mobile people might like to configure equipment they access to fit their individual needs in an easy way. The equipment could be configured manually. Another approach could use badges or active badges that identify a person with a personal badge towards the equipment which is to be operated. But manual configuration is often quite time consuming and tedious. A problem with plain active badges is that each equipment has to be configured manually according to each person's need, i.e., a certain instance of an equipment has to be configured manually for each person that later might use the equipment.

Other issues that not are covered by these approaches include:

Badge and user authentication as well as general security aspects such as encryption and integrity.

How to charge for such services?

How may an operator provide such services to its customers?

How may an operator provide badge-related services?

QoS (Quality Of Service), e.g., what bandwidth should be set-up from the network towards the operable equipment?

SUMMARY

An arrangement for automatic equipment remote control according to a predetermined user profile, comprises: a user identity badge provided with a first wireless communication device having a first identifier, controllable equipment automatically responsive to a user profile and provided with and connected to a second wireless communication device having a second identifier, a mobile communication terminal adapted to communicate by an Internet Protocol (IP) network, said mobile communication terminal being provided with and connected to a third wireless communication device having a third identifier, and a user profile server connected to said IP network and holding the predetermined user profile, wherein said first, second and third wireless communication devices are adapted to communicate with one another, said first wireless communication device is adapted to communicate to said second wireless communication device, when in-range, the first identifier, said second wireless communication device is adapted to communicate to said third wireless communication device, when in-range, the first and second identifiers, the mobile equipment is adapted to communicate to the user profile server the first, second and third identifiers, and the user profile server is adapted to communicate to the controllable equipment, via the mobile terminal, the third wireless device and second wireless device, on basis of the second and third identifiers, the predetermined user profile in response to receiving the first and second identifiers.

The mobile communication terminal may be enabled to communicate to said user profile server, via said IP network, a user identifier received from said user identity badge, and an equipment identifier received, optionally via said user identity badge, from said equipment. The user profile server may be enabled to communicate via said IP network and said mobile communication terminal and, optionally, via said user identity badge, the predetermined user profile to the identified equipment in response to receiving said user identifier and equipment identifier. The predetermined user profile may be stored in a memory of said user profile server.

An arrangement for automatic equipment remote control according to a predetermined user profile, comprises: a user identity badge provided with a first wireless communication device having a first identifier, controllable equipment automatically responsive to a user profile, said controllable equipment provided with and connected to a second wireless communication device having a second identifier, and connected to an Internet Protocol (IP) network, and a user profile server connected to said IP network and holding the predetermined user profile, wherein, said first and second wireless communication devices are adapted to communicate with one another, said first wireless communication device is adapted to communicate to said second wireless communication device, when in-range, the first identifier, said controllable equipment is adapted to communicate to the user profile server, via the Internet Protocol (IP) network, the first and second identifiers, and the user profile server is adapted to communicate to the controllable equipment, via the Internet Protocol (IP) network, on basis of the second identifier, the predetermined user profile in response to receiving the first and second identifiers.

The equipment may be enabled to communicate an equipment identifier and a user identifier received from the user identity badge to said user profile server. The user profile server may be enabled to communicate the predetermined user profile to said equipment in response to receiving said user identifier and equipment identifier. The IP network may be a multimedia network, a H.323 network or a SIP network. The first and second wireless communication devices may be Bluetooth enabled wireless communication devices.

An method for automatic equipment remote control according to a predetermined user profile, comprises: wirelessly communicating a user identifier from a user identity badge to a mobile communication terminal, wirelessly communicating an equipment identifier from an equipment to be controlled to a mobile communication terminal, forwarding from said mobile communication terminal, via a gateway to an IP network, a first information set including said user identifier and equipment identifier and/or a mobile terminal identifier to a User Agent (UA) in a Internet Protocol network, forwarding from said UA said first information set, via a Call Control API (CC-API), to a Service Agent (SA), returning from said SA a second information set including said predetermined user profile, via said Call Control API (CC-API), to said UA, forwarding from said UA said second information set, via a gateway to a mobile communication network, to said mobile communication terminal, wirelessly communicating from said mobile communication terminal said second information set to said equipment, and configuring said equipment according to said predetermined user profile.

An method for automatic equipment remote control according to a predetermined user profile, comprises: wirelessly communicating a user identifier from a user identity badge to an equipment, forwarding from said equipment said user identifier and an equipment identifier to a User Agent (UA) in an Internet Protocol (IP) network, forwarding from said UA information including said user identifier and equipment identifier, via a Call Control API (CC-API), to a Service Agent (SA), returning from said SA information including said predetermined user profile, via said Call Control API (CC-API), to said UA, forwarding from said UA said predetermined user profile to said equipment, and configuring said equipment according to said predetermined user profile. The mobile terminal may be a mobile telephone, and said mobile terminal identifier may include a telephone number of said mobile telephone.

BRIEF DESCRIPTION OF THE DRAWINGS

In the following, the invention will be described by way of example, and illustrations thereof in the accompanying drawings, in which.

DETAILED DESCRIPTION

Figure 1:
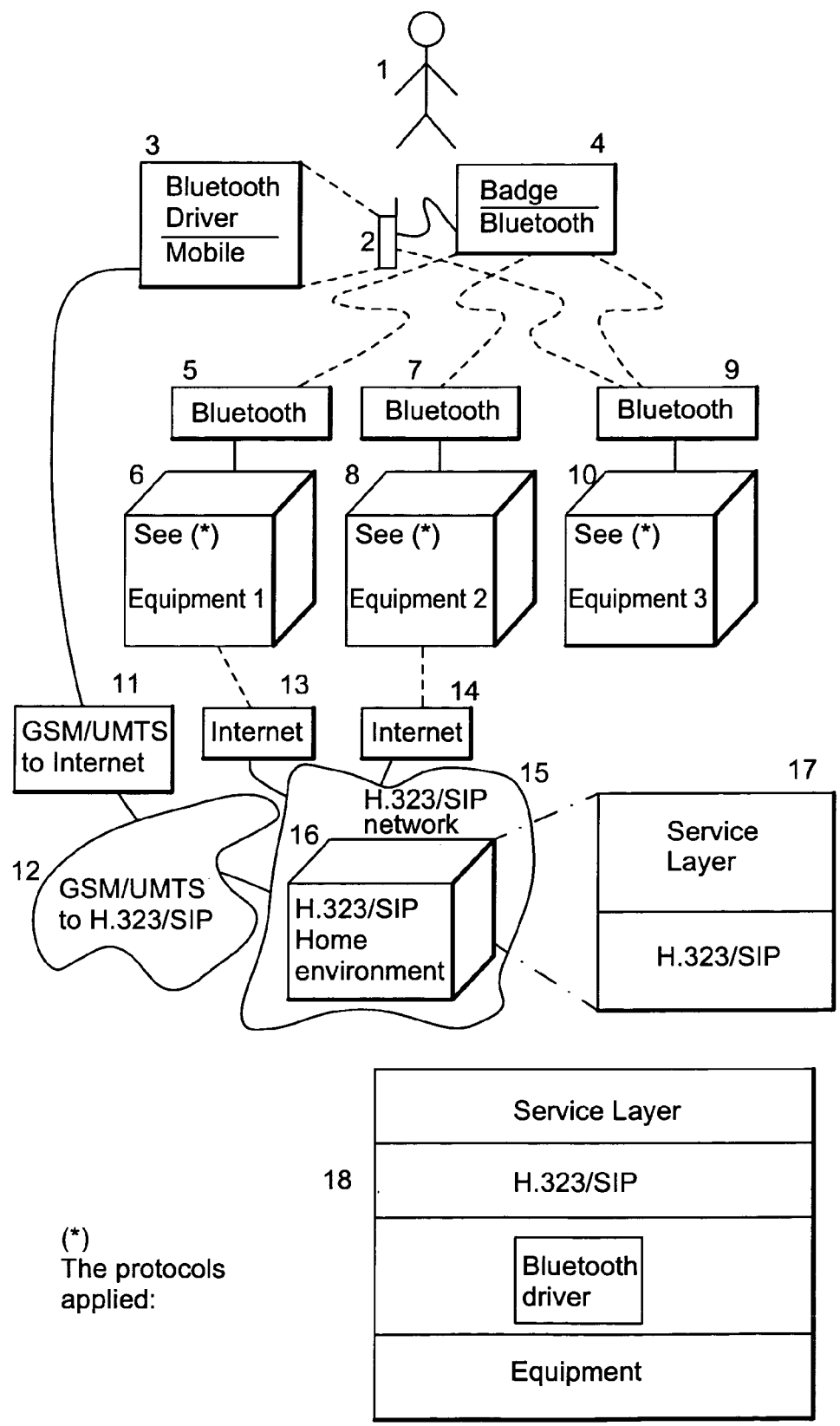
FIG. 1 shows a schematic representation of an example of an arrangement according to the invention illustrating how personal settings easily might be applied to equipment.

Now, referring to FIG. 1, an example situation is shown where a person has arrived at a location, where different equipments 6, 8 and 10 are located, and which equipments the person 1 (user) wants to personalize, meaning that the person wants to configure equipment at the location according to her/his personal needs, wishes or requirements. The equipments 6, 8 and 10, could be any controllable or configurable device, such as for instance a communication terminal (for example SIP or H.323), a video or sound player, etc. In this example, two situations are shown:

a) One where the equipment is connected to the Internet; and b) one where the equipment is not connected to the Internet.

In FIG. 1, "equipment 1" 6 and "equipment 2" 8 exemplify the situation where the equipment is connected to the Internet, while "equipment 3" 10 exemplify the situation where equipment is not connected to the Internet. Depending on the collection of parameters, of which at least one parameter is a personal identification (Id), transmitted from the user by the mobile phone terminal 2 to the home environment 16, a corresponding personal equipment configuration profile is forwarded to the equipment 6, 8, 10, and the equipment 6, 8, 10 is configured accordingly. In the home environment 16, a call control API is located in-between the service layer and the H.323/SIP layer, as illustrated by the block assigned reference numeral 17. A badge Id associated with badge 4 is a personal Id, and is directly connected to the identity of a particular user.

The home environment 16 is a location where the user 1 keeps or stores her/his profiles according to e.g. GSM's Home Location Register (HLR). The home environment 16 includes an electronic memory to hold or store the personal profiles, the memory preferably being an electronic database (DB) system. In situations where the network is H.323 enabled, preferably an H.323 gatekeeper is providing the services of the home environment 16. However, in a SIP enabled network, preferably a SIP server would perform these tasks.

In the following, a few examples of equipment and advantages of the solution provided by the present invention are presented. It should be kept in mind that authentication, security etc. are inherent to and provided by a H.323 (or SIP) enabled network, and therefore, will greatly enhance a system according to the invention. In a first example, the equipment, such as e.g. one or more of equipments 6, 8 or 10 shown in FIG. 1, is a multimedia terminal. The home environment can be updated with information about the current location of the user, for the purpose of e.g. redirecting every invoke to the user towards the multimedia terminal. Since a multimedia terminal typically has better capabilities than the mobile phone terminal 2, the user may prefer to use the multimedia terminal instead of the mobile phone terminal. This service provided by a system is referred to as a multi-terminal service.

In a second example, the operation of the equipment is software based depending on the parameters transmitted from the user's terminal 2 to the home environment 16. Corresponding software is forwarded to the equipment 6, 8 or 10, installed, and put into operation to obtain the required equipment functions, capabilities and/or properties. In a third example, the equipment 6, 8 or 10 is a video or sound player. Depending on the badge Id transmitted from the badge 4 and forwarded to the home environment 16, the corresponding favourite video and/or sound programming is forwarded to the equipment 6, 8 or 10 to be enjoyed by the user 1. In the three examples above, the industry standard wireless Bluetooth technology may be used, but it will be understood that other wireless technologies may be utilized in a system according to the invention.

A Personal Equipment Service (PES) function allocated in the Service Node 15 of a H.323 (or SIP) based network may serve the requests for the user-specific or tailor-made equipment profile to be downloaded. Other services existing might interact with the PES service.

The following example relates to an arrangement where the equipment is not connected to Internet. In this example, reference is only made to H.323, but the network utilized also be some other IP enabled network, such as e.g. a SIP based network.

Figure 2:
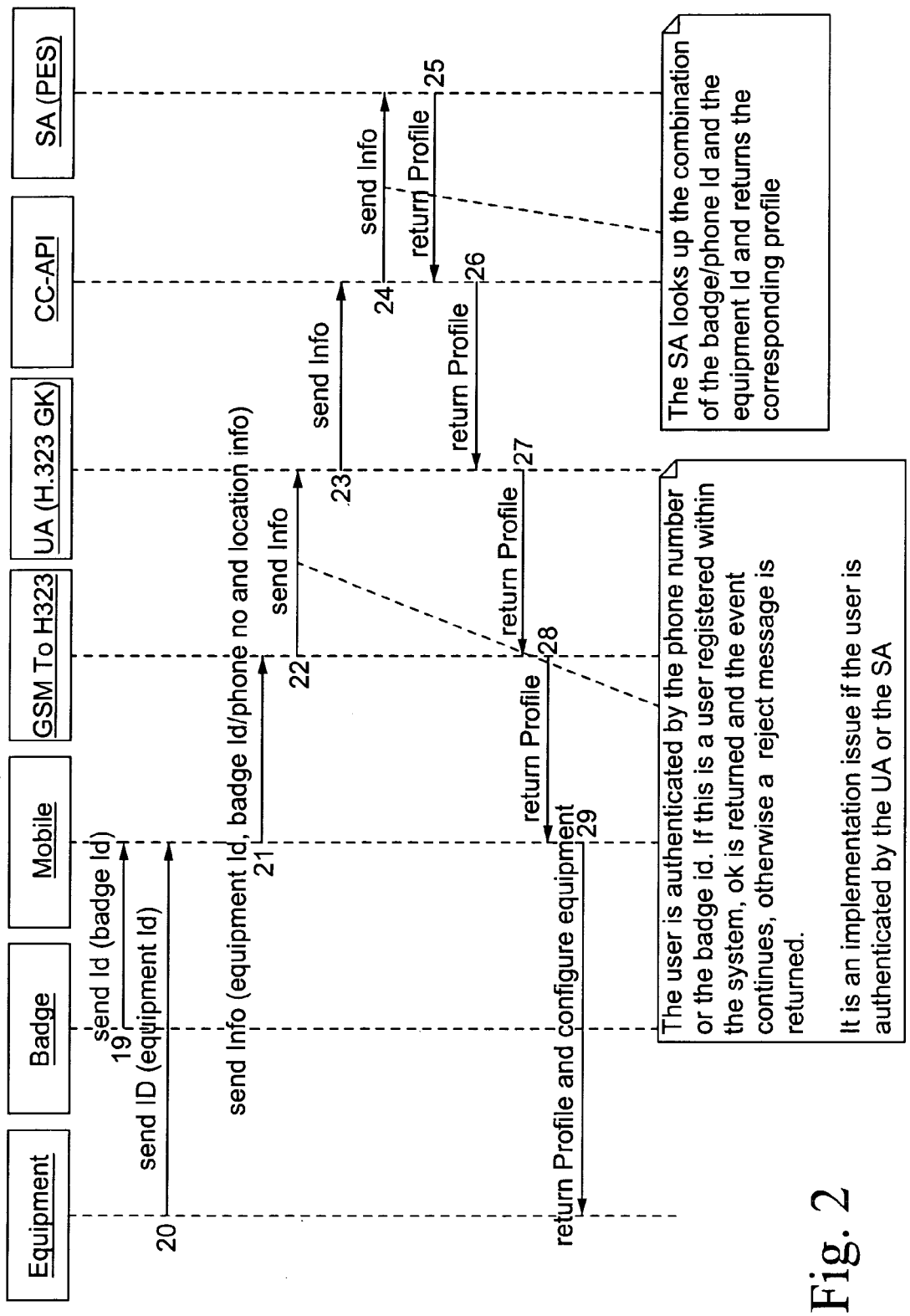
FIG. 2 shows an exemplary sequence diagram for an example of the sequence flow of the personal equipment service according to the invention illustrated by using a H.323 network applicable to a situation where the equipment is not connected to the internet.

FIG. 2 shows a sequence example of an example method, preferably employed in a system like the system shown in FIG. 1 comprising equipment to be controlled that is not connected to the IP network. A mobile phone terminal is used for downloading personal profiles or settings in order to configure the equipment according to personal needs. The badge Id and the equipment Id are in steps 19 and 20, respectively, transferred by respective short-range wireless devices, such as e.g. Bluetooth technology devices, to the mobile phone terminal when these are within range of each other. In step 21, the mobile phone terminal transmits a set of information comprising its own Id and/or the mobile phone number, the received badge Id and equipment Id, and, optionally, location information, and through steps 22, 23 and 24, the set of information is transferred to the home environment in order to identify the person and the equipment to be configured to the requirements of the user. The personal profiles or settings, preferably stored in the home environment, are then through steps 25, 26, 27 and 28 forwarded from the home environment, by means of the network, to the mobile phone terminal. In turn, the mobile phone terminal, in step 29, forwards by short-range wireless means, such as e.g. Bluetooth technology devices, the profile to the equipment and which then is configured accordingly. It will be readily apparent to a person skilled in the art that the technology of the mobile phone terminal is not limiting for the invention, and that the mobile phone terminal in this situation can be based on any known or coming mobile phone technology (GSM, UMTS etc.) that is capable of communicating with a network and having an interface adapted to forward electronically to a short-range wireless device, information received via the network. It will also be understood that the location information can be used for triggering location dependent services provided by the equipment to be controlled, by the profile or settings provided by the home environment and intended for the equipment.

As can be seen from FIG. 1, a wireless device 3, such as e.g. a Bluetooth technology device, that is enabled for and potentially able to convey and/or forward the badge Id to the home environment, is associated with and connected to the mobile phone terminal 2. Accordingly, the equipment, exemplified in FIG. 1 by equipments 6, 8 and 10, included in an arrangement employing the invention, are each in communication with a corresponding a wireless device, such as e.g. a Bluetooth technology device, 5, 7 and 9, respectively. The arrangement shown by the example of FIG. 1 also comprises a gateway (GW) function 11, 12 between the Public Land Mobile Network (PLMN) and the H.323 network. For security purposes, GSM information is for example encrypted so as to maintain the security within the PLMN network, while the H.323 network can provide corresponding security connections. In the H.323 network, a H.323 gatekeeper (UA) (not shown in FIG. 1, but illustrated by the sequence diagrams of FIGS. 2 and 3) is communicating with the Service Agent (SA) (referred to as the "service layer" in FIG. 1) running the Personal Equipment Service (PES) over a call control API (CC-API). The CC-API can be any suitable CC-API, such as a proprietary type, a Telephone Application Interface (TAPI), Parly, etc. The H.323 GK (UA) is responsible for charging the user, i.e. for sending Call Detail Records (CDRs) to a known billing server (not shown) of the network, as well as for authenticating the user. If a quality of service (QoS) is specified and/or required, the UA can also be responsible for setting up a connections from the UA towards the equipment with a certain QoS. The SA is referred to as the service layer in FIG. 1.

In an alternative embodiment, the badge 4 can be incorporated into the mobile communication terminal 2.

Figure 3:
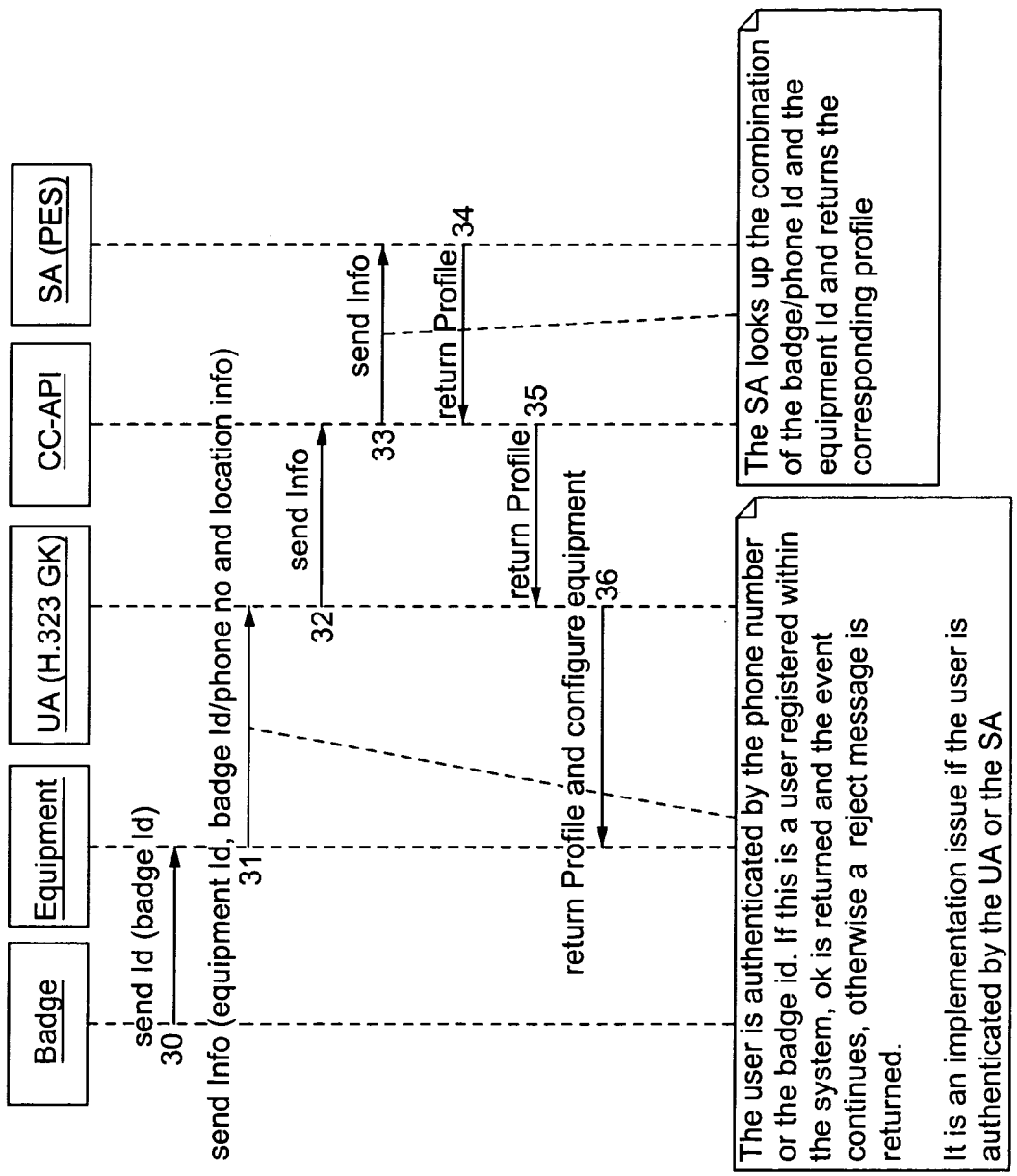
FIG. 3 shows an exemplary sequence diagram for an example of the sequence flow of the personal equipment service according to the invention illustrated by using a H.323 network applicable to a situation where the equipment is connected to the Internet.

FIG. 3 shows a method where the equipment is connected to Internet. Examples of such equipment with connection to the Internet are also illustrated in FIG. 1 by equipments represented by "equipment 1" 6 and "equipment 2" 8. Further, in this example, reference is only made to H.323, but the network could but the network utilised in a system according to the invention could also be some other IP enabled network, such as e.g. a SIP based network.

With reference to FIG. 3, the mobile phone can be regarded superfluous in this case. An Internet connection 13, 14 linking the equipment 6,8 with the Internet can be used for both sending and receiving the badge Id and the personal profiles, or settings, respectively, between the equipment 6,8 and the home environment 16. In this case, where the equipment is connected to the Internet, the sequence flow shown in FIG. 3 is only in part like the sequence described in the previous explanation with reference to FIG. 2. In FIG. 3, if the equipment to be controlled or configured is H.323 adapted, then the HTTP service channel (see specification H.323, Annex K) can be used for sending the badge Id from the badge 4 to the equipment 6 or 8, via the equipment associated wireless device 5 or 7, respectively, and receiving the equipment profiles. A personal wireless electronic badge, in step 30, when coming into range of a wireless device connected to equipment to be controlled, sends its Id to the equipment. In steps 31, 32 and 33, a set of information including the badge Id, equipment Id and, if available, location information is forwarded via the network from the equipment to the home environment represented by the SA (PES). In turn, the SA looks up the combination of badge Id and equipment Id, and, if a profile or equipment setting corresponding to the information set is found. In steps 34, 35 and 36, the profile or equipment settings is forwarded via the network directly from the SA (PES) to the equipment. On receiving the profile, the equipment is configured accordingly. In this example, authentication and/or access control is provided by the UA or SA, depending on the actual implementation.

Alternatively, as a variant of combining parts of the sequences illustrated in FIGS. 2 and 3, an arrangement according to steps 19 through 24 can use a mobile phone terminal for transferring the information set, via the network, to the home environment (or SA (PES)), while the corresponding profile is transferred according to steps 34 through 36 via an Internet connection directly from the home environment (or SA (PES)) to the equipment.

Without a mobile telephone terminal, the location info is in the case illustrated by FIG. 3, not as easily transferred as in the case illustrated by FIG. 2 using a mobile phone. This is because, when it comes to Internet based equipment, no well known technology mapping IP address etc. to location is available, while, when using a mobile phone, the mobile phone can be used for obtaining and/or providing location information.

The invention reduces personal efforts in configuration of personal equipment. This is particularly advantageous when the equipment is used by many different persons requiring different equipment configurations or settings, and also when the equipment is used frequently by the same persons.

The invention claimed is:

1. An arrangement for automatic equipment remote control according to a predetermined user profile, comprising:
   a user identity badge provided with a first wireless communication device having a first identifier,
   controllable equipment automatically responsive to a user profile and connected to a second wireless communication device having a second identifier,
   a mobile communication terminal adapted to communicate by an Internet Protocol (IP) network and connected to a third wireless communication device having a third identifier, and
   a user profile server connected to said IP network and holding the predetermined user profile,
   wherein,
   said first, second, and third wireless communication devices are adapted to communicate wirelessly with one another,
   said first wireless communication device is adapted to communicate to said second wireless communication device the first identifier,
   said second wireless communication device is adapted to communicate to said third wireless communication device the first and second identifiers, the mobile equipment is adapted to communicate to the user profile server the first, second and third identifiers, and the user profile server is adapted to communicate to the controllable equipment, via the mobile terminal, the third wireless device and second wireless device, on basis of the second and third identifiers, the predetermined user profile in response to receiving the first and second identifiers.

2. The arrangement of claim 1, wherein said mobile communication terminal is enabled to communicate to said user profile server, via said IP network, a user identifier received from said user identity badge, and an equipment identifier received, optionally via said user identity badge, from said equipment.

3. The arrangement of claim 2, wherein said user profile server is enabled to communicate, via said IP network and said mobile communication terminal and, optionally, via said user identity badge, the predetermined user profile to the identified equipment in response to receiving said user identifier and equipment identifier.

4. The arrangement of claim 1, wherein said predetermined user profile is stored in a memory of said user profile server.

5. The arrangement of claim 1, wherein said IP network is a multimedia network, a H.323 network, or a SIP network.

6. The arrangement of claim 1, wherein the first and second wireless communication devices are short range wireless digital communication devices.

7. An arrangement for automatic equipment remote control according to a predetermined user profile, comprising: a user identity badge provided with a first wireless communication device having a first identifier, controllable equipment automatically responsive to a user profile and connected to a second wireless communication device having a second identifier and connected to an Internet Protocol (IP) network, and a user profile server connected to said IP network and holding the predetermined user profile, wherein:

said first and second wireless communication devices are adapted to communicate wirelessly with one another, said first wireless communication device is adapted to communicate to said second wireless communication device the first identifier, said controllable equipment is adapted to communicate to the user profile server, via the Internet Protocol (IP) network, the first and second identifiers, and the user profile server is adapted to communicate to the controllable equipment, via the Internet Protocol (IP) network, on basis of the second identifier, the predetermined user profile in response to receiving the first and second identifiers.

8. The arrangement of claim 7, wherein said equipment is enabled to communicate an equipment identifier and a user identifier received from the user identity badge to said user profile server.

9. The arrangement of claim 8, wherein said user profile server is enabled to communicate the predetermined user profile to said equipment in response to receiving said user identifier and equipment identifier.

10. The arrangement of claim 9, wherein said predetermined user profile is stored in a memory of said user profile server.

11. A method for equipment remote control according to a predetermined user profile, comprising:

wirelessly communicating a user identifier from a user identity badge to a mobile communication terminal, wirelessly communicating an equipment identifier from an equipment to be controlled to the mobile communication terminal, forwarding from said mobile communication terminal, via a gateway to an IP network, a first information set including said user identifier and equipment identifier to a User Agent (UA) in an Internet Protocol network, forwarding from said UA said first information set, via a Call Control API (CC-API), to a Service Agent (SA), returning from said SA a second information set including said predetermined user profile, via said Call Control API (CC-API), to said UA, forwarding from said UA said second information set, via a gateway to a mobile communication network, to said mobile communication terminal, wirelessly communicating from said mobile communication terminal said second information set to said equipment, and configuring said equipment according to said predetermined user profile.

12. The method of claim 11, wherein said mobile terminal is a mobile telephone, and said mobile terminal identifier includes a telephone number of said mobile telephone.

13. The method of claim 11, wherein said IP network is a multimedia network, a H.323 network or a SIP network.

14. The method of claim 11, wherein wirelessly communicating is performed by of a short range wireless digital communications device.

15. Apparatus for automatic equipment remote control according to a predetermined user profile, comprising:

means for wirelessly communicating a user identifier from a user identity badge to a mobile communication terminal, means for wirelessly communicating an equipment identifier from an equipment to be controlled to the mobile communication terminal, means for forwarding from said mobile communication terminal, via a gateway to an IP network, a first information set including said user identifier and equipment identifier to a User Agent (UA) in a Internet Protocol network, means for forwarding from said UA said first information set, via a Call Control API (CC-API), to a Service Agent (SA), means for returning from said SA a second information set including said predetermined user profile, via said Call Control API (CC-API), to said UA, means for forwarding from said UA said second information set, via a gateway to a mobile communication network, to said mobile communication terminal, means for wirelessly communicating from said mobile communication terminal said second information set to said equipment, and means for configuring said equipment according to said predetermined user profile.

16. The apparatus of claim 15, wherein said mobile terminal is a mobile telephone, and said mobile terminal identifier includes a telephone number of said mobile telephone.

17. The apparatus of claim 15, wherein said IP network is a multimedia network, a H.323 network or a SIP network.

* * * * *